(12) United States Patent
Tsai et al.

(10) Patent No.: US 7,855,881 B2
(45) Date of Patent: Dec. 21, 2010

(54) MOUNTING APPARATUS FOR BACK PANEL

(75) Inventors: Ho-Chin Tsai, Taipei Hsien (TW); Sheng-Hung Lee, Taipei Hsien (TW); Li-Ping Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 681 days.

(21) Appl. No.: 11/853,835

(22) Filed: Sep. 12, 2007

(65) Prior Publication Data
US 2009/0040744 A1 Feb. 12, 2009

(30) Foreign Application Priority Data
Aug. 7, 2007 (CN) .................... 2007 2 0200786 U (51) Int. Cl.
G06F 1/16 (2006.01)
H05K 5/00 (2006.01)
H05K 7/00 (2006.01)

(52) U.S. Cl. .................... 361/679.37; 312/223.1
(58) Field of Classification Search ............ 361/679.02, 361/679.33, 679.37, 679.39; 312/223.1, 312/223.2, 333
See application file for complete search history.

(56) References Cited

U.S. PATENT DOCUMENTS

| | | | | | |
|---|---|---|---|---|---|
| 5,542,757 A * | 8/1996 | Chang | ................. | 312/223.2 |
| 5,944,398 A * | 8/1999 | Wu | ................. | 312/223.2 |
| 5,947,762 A * | 9/1999 | Katsuma | ................. | 439/468 |
| 5,986,881 A * | 11/1999 | Yang | ................. | 361/679.32 |
| 5,997,115 A * | 12/1999 | Radloff et al. | ................. | 312/222 |
| 6,054,662 A * | 4/2000 | Hrehor et al. | ................. | 200/332 |
| 6,102,501 A * | 8/2000 | Chen et al. | ................. | 312/223.2 |
| 6,209,975 B1 * | 4/2001 | Lai | ................. | 312/223.2 |
| 6,234,592 B1 * | 5/2001 | Liu et al. | ................. | 312/223.2 |
| 6,257,682 B1 * | 7/2001 | Liu et al. | ................. | 312/223.2 |
| 6,373,695 B1 * | 4/2002 | Cheng | ................. | 361/679.39 |
| 6,419,330 B1 * | 7/2002 | Lechman | ................. | 312/194 |
| 6,557,385 B1 * | 5/2003 | Shih | ................. | 70/161 |
| 6,590,848 B1 * | 7/2003 | Chen | ................. | 720/654 |
| 6,628,512 B2 * | 9/2003 | Searby et al. | ................. | 361/679.58 |
| 6,644,762 B1 * | 11/2003 | Chen | ................. | 312/223.2 |
| 6,738,255 B2 * | 5/2004 | Chen | ................. | 361/679.02 |
| 6,899,407 B1 * | 5/2005 | Lai | ................. | 312/223.2 |
| 6,925,843 B1 * | 8/2005 | Pols Sandhu et al. | ................. | 70/86 |
| 6,954,354 B2 * | 10/2005 | Shyr | ................. | 361/679.33 |
| 7,072,178 B2 * | 7/2006 | Chen et al. | ................. | 361/679.33 |
| 7,151,666 B2 * | 12/2006 | Song | ................. | 361/692 |
| 7,166,799 B2 * | 1/2007 | Chen et al. | ................. | 174/50 |
| 7,179,991 B2 * | 2/2007 | Chen et al. | ................. | 174/50 |
| 7,232,193 B2 * | 6/2007 | Cunningham et al. | ................. | 312/265.5 |
| 7,290,842 B1 * | 11/2007 | Lai | ................. | 312/223.2 |
| 7,375,960 B2 * | 5/2008 | Blaalid et al. | ................. | 361/679.33 |

(Continued)

*Primary Examiner*—Jayprakash N Gandhi
*Assistant Examiner*—Adrian S Wilson
(74) *Attorney, Agent, or Firm*—Frank R. Niranjan (57) ABSTRACT

A mounting apparatus comprises two drive brackets (11) for receiving disk drives, a back panel (13), and a securing member (20). The back panel has a securing opening (134) defined therein. The securing member is pivotably mounted between the two brackets for rotating to engage with the securing opening of the back panel to secure the back panel on the drive brackets during the process that the back panel is mounted to the drive brackets.

16 Claims, 6 Drawing Sheets

U.S. PATENT DOCUMENTS

| | | | |
|---|---|---|---|
| 7,404,610 B2* | 7/2008 | Smith et al. | 312/223.2 |
| 7,486,505 B2* | 2/2009 | Fushimi et al. | 361/679.08 |
| 7,510,250 B2* | 3/2009 | Lin et al. | 312/223.2 |
| 7,719,834 B2* | 5/2010 | Miyamoto et al. | 361/695 |
| 7,722,136 B2* | 5/2010 | Chen et al. | 312/223.2 |
| 2003/0011981 A1* | 1/2003 | Curtis et al. | 361/685 |
| 2003/0223192 A1* | 12/2003 | Searby et al. | 361/683 |
| 2004/0240166 A1* | 12/2004 | Kuo | 361/683 |

* cited by examiner

MOUNTING APPARATUS FOR BACK PANEL

BACKGROUND

1. Field of the Invention

The present invention relates to mounting apparatuses, and more particularly to a mounting apparatus for securing a back panel.

2. Description of related art

Generally, a plurality of large data storage devices is needed in a server system. It is well known that the server system isn't switched off when the data storage devices are serviced or replaced. The data storage devices are detached and installed from/to the server system while the server system remains online. A back panel is usually secured to a drive bracket that accommodates the data storage devices. The data storage devices can electrically connect with the back panel when installed in the drive bracket.

In a mounting apparatus for securing the back panel to the drive bracket, a locking plate is provided to hold the back panel. The drive bracket includes a pair of sidewalls and a bottom wall. A plurality of posts is respectively disposed on the sidewalls and the bottom wall. The locking plate has two bent clips formed on opposite edges, and a bottom clip formed on a bottom edge. Two guiding slots and a through hole are defined in each bent clip, and two through holes are defined in the bottom clip. In assembly, the back panel together with the locking plate is inserted in the drive bracket between the sidewalls. The posts of the sidewalls of the drive bracket are slid into the guiding slots of the bent clips of the locking plate, and the posts of the bottom wall are inserted into the through holes of the bottom clip. Numerous fasteners are respectively engaged with the posts of the bottom wall of the drive bracket, and engaged into the through holes of the bent clips, thereby fixing the back panel and the locking clip into the drive bracket. However, the mounting apparatus has a complicated structure, and the manufacturing cost is high.

What is needed, therefore, is a mounting apparatus for securing a back panel on a drive bracket with a simple structure.

SUMMARY

A mounting apparatus comprises two drive brackets for receiving disk drives, a back panel, and a securing member. The back panel has a securing opening defined therein. The securing member is pivotably mounted between the two brackets for rotating to engage with the securing opening of the back panel to secure the back panel on the drive brackets during the process that the back panel is mounted to the drive brackets.

Other advantages and novel features will be drawn from the following detailed description of preferred embodiments with attached drawings, in which:

DETAILED DESCRIPTION OF THE PREFERRED EMBODIMENT

Figure 1:
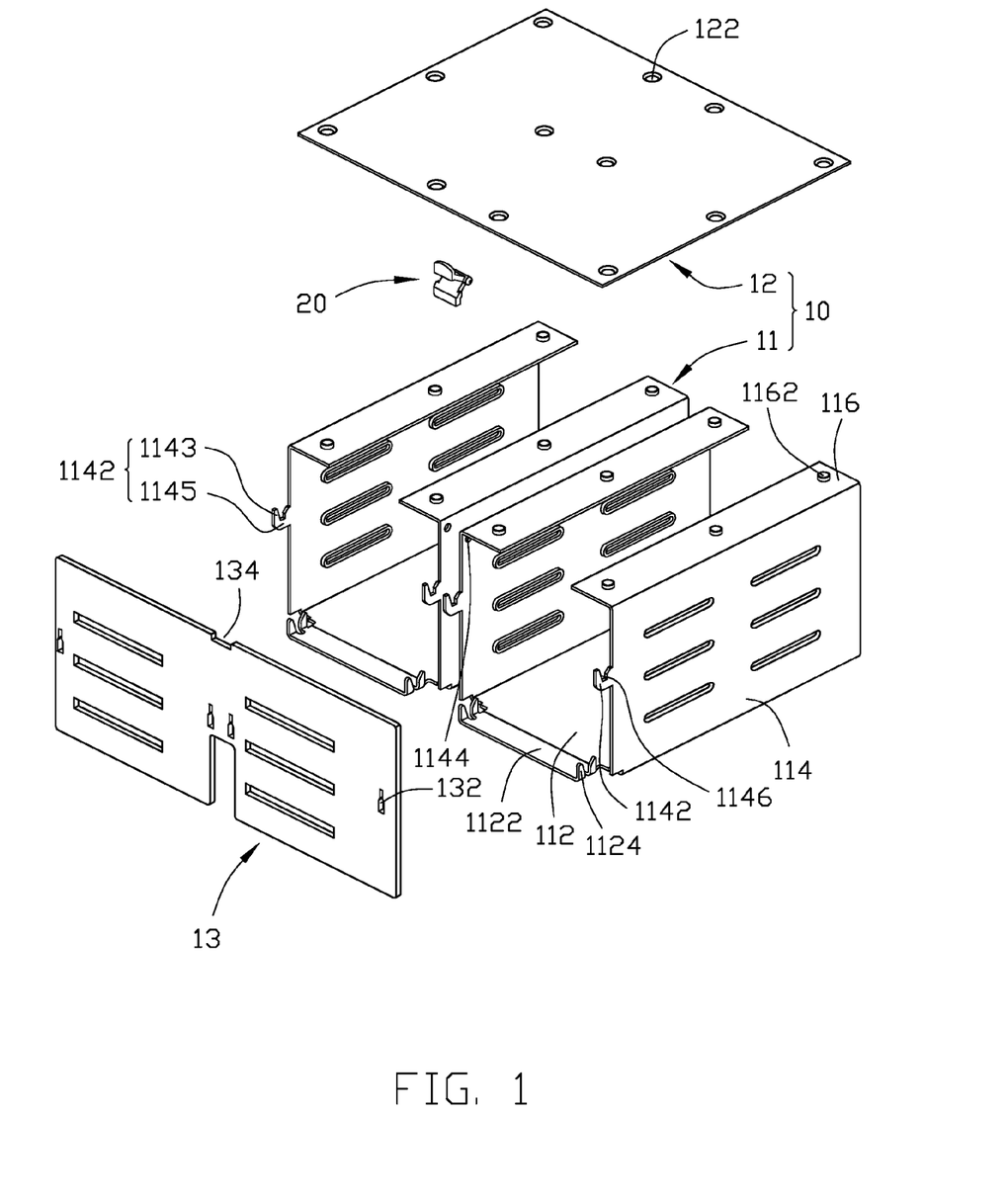
FIG. 1 is an exploded, isometric view of a mounting apparatus of a preferred embodiment of the present invention, together with a back panel, the mounting apparatus including a drive bracket assembly, and a securing member.

Referring to FIG. 1, a mounting apparatus for securing a component such as back panel 13 to another component such as a drive bracket, includes a drive bracket assembly 10 configured for accommodating devices like data storage devices, the back panel 13, and a securing member 20. The data storage devices can be hard disk drives of a computer system or a server system.

The drive bracket assembly 10 includes a top plate 12 and a pair of brackets 11. Each bracket 11 includes a bottom plate 112 and two side plates 114. The top plate 12 is parallel to the bottom plate 112. The side plates 114 are perpendicular to both the top plate 12 and the bottom plate 112, and parallel to each other. A securing portion 116 perpendicularly extends inwards from a top side of each side plate 114. A plurality of protrusions 162 protrudes from each securing portion 116. A plurality of generally L-shaped hooks 142 is respectively formed at a rear end edge of each side plate 114, extending upward toward the top plate 12. Each hook 1142 has a shank portion 1145 and a hook portion 1143. The shank portion 1145 substantially horizontally extends from a rear edge of the corresponding side panel 114 for supporting the back panel 13. The hook portion 1143 extends upward from a distal end of the shank portion 1145. The hook portion 1143 has a slanted guiding edge 1146 facing the side panel 114. Two adjacent side plates 114 of the two brackets 11 define a pivoting hole 1144 respectively. An extending portion 1122 extends from a rear end edge of the bottom plate 112 of each bracket 11. A pair of positioning tabs 1124 is bent upwards at opposite ends of the extending portion 1122 respectively. Each pair of positioning tabs 1124 defines a positioning opening therebetween. The top plate 12 defines a plurality of through holes 122 for receiving the protrusions 1162 of the securing portions 116 of the side plates 114.

The back panel 10 has a plurality of locking openings 132 for engaging with the hooks 1142 of the side plates 114, and a securing opening 134. Each locking opening 132 includes a wide portion and a narrow portion. Each wide portion has a greater width than that of each narrow portion. The width of each narrow portion is generally equal to the thickness of each hook 1142 of the side plates 114.

Figure 2:
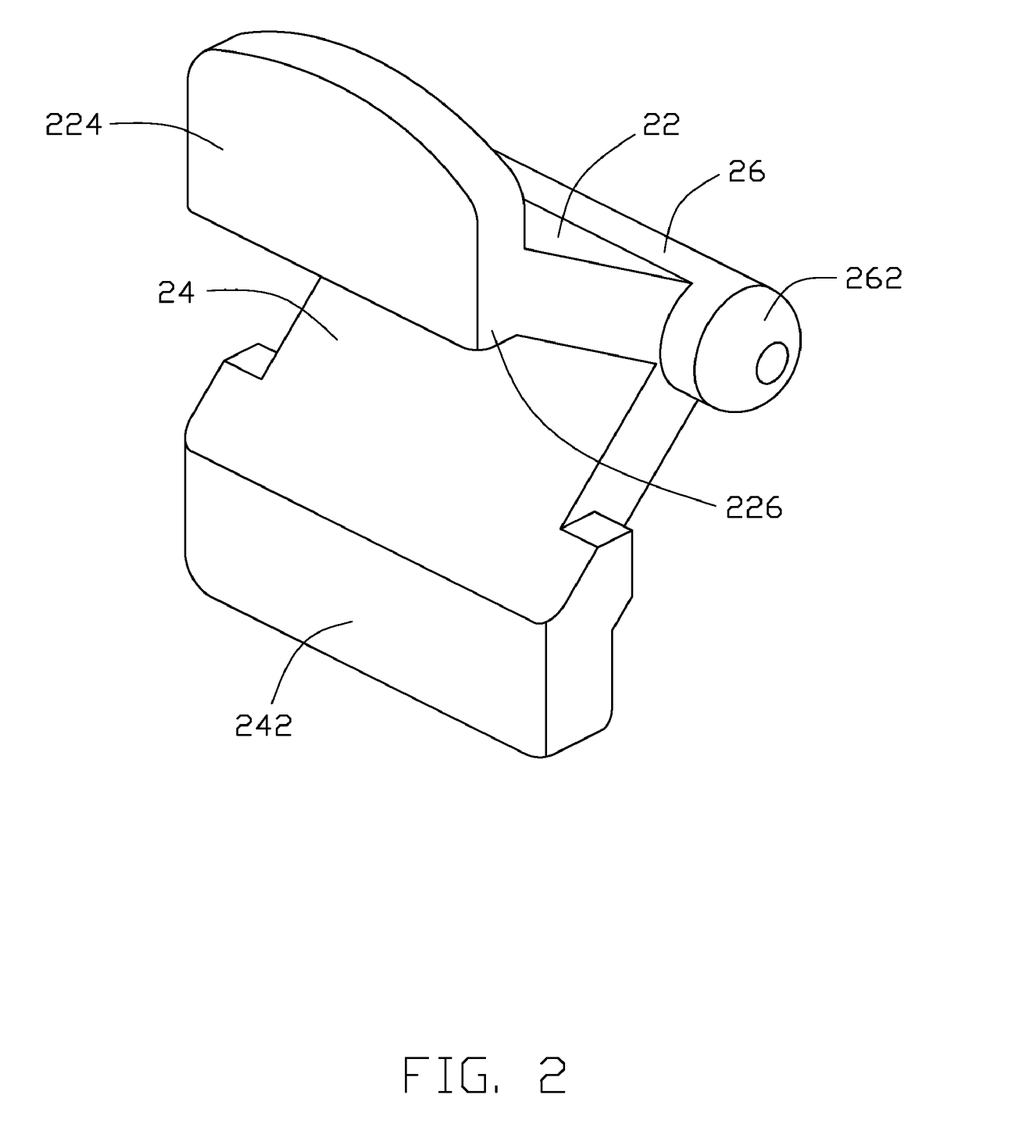
FIG. 2 is an isometric view of the securing member of FIG. 1.
Figure 3:
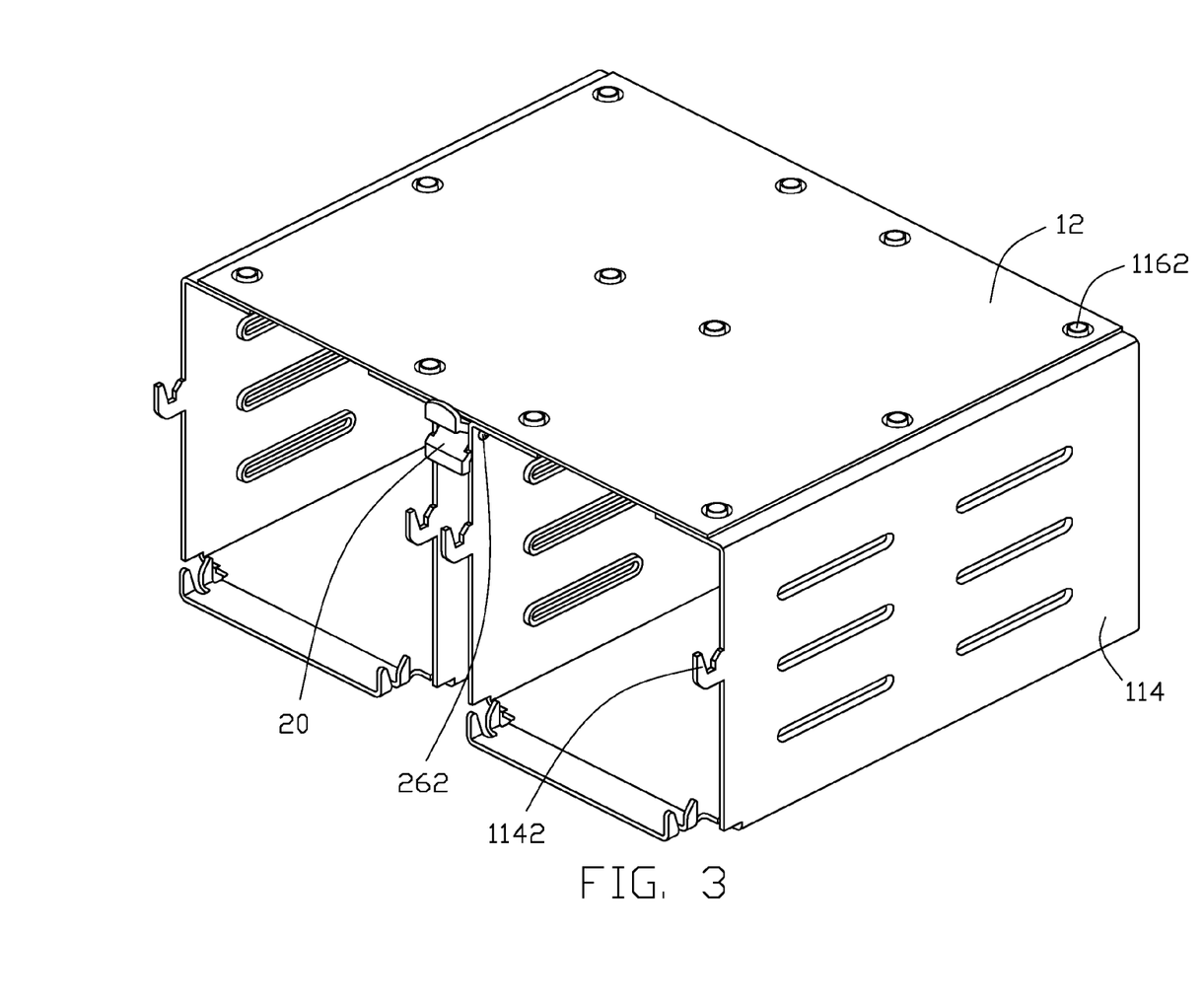
FIG. 3 is an assembled isometric view of the drive bracket assembly and the securing member of FIG. 1.
Figure 4:
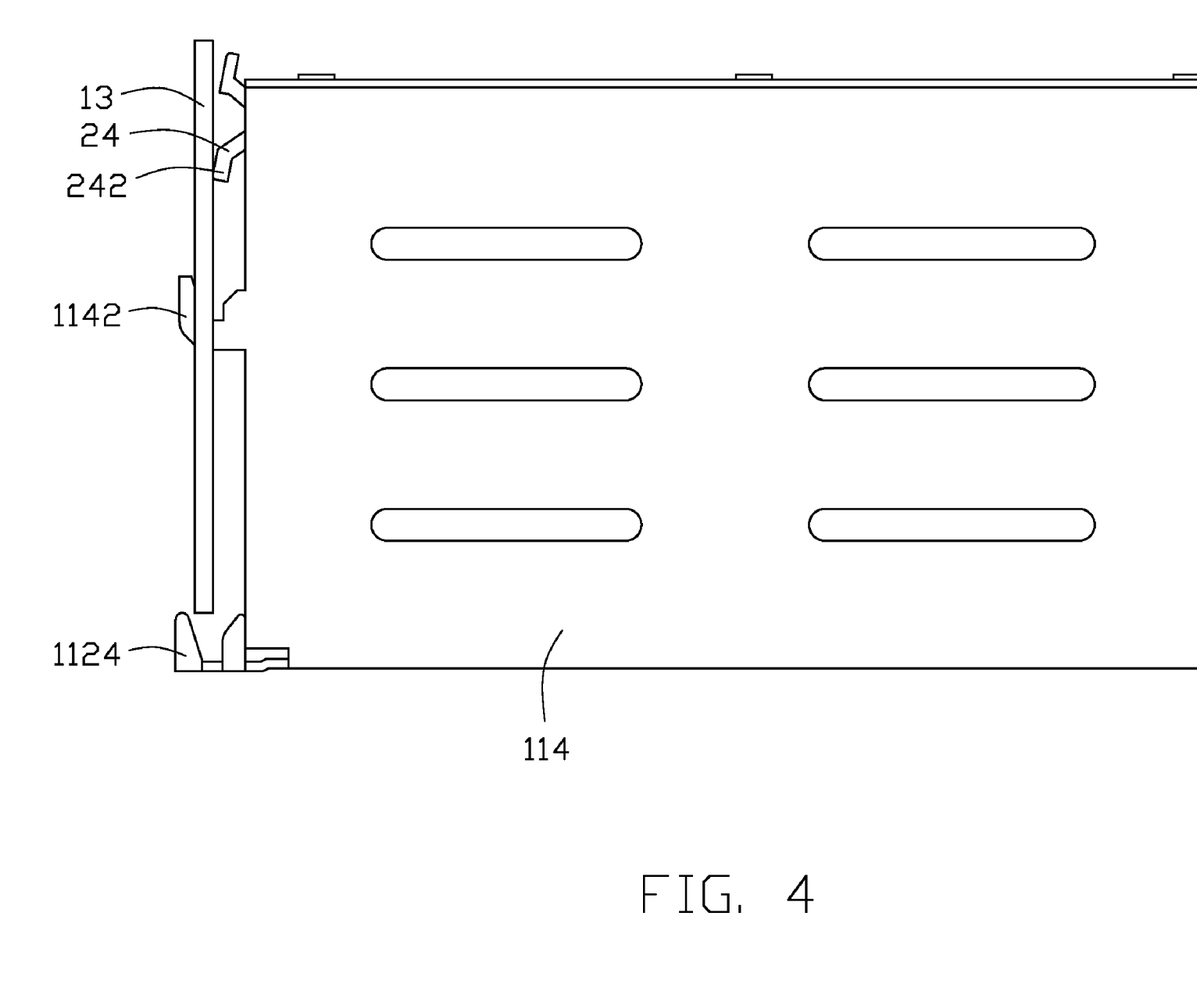
FIG. 4 is a pre-assembled side view of FIG. 1, showing the back panel in an unlocked position.
Figure 5:
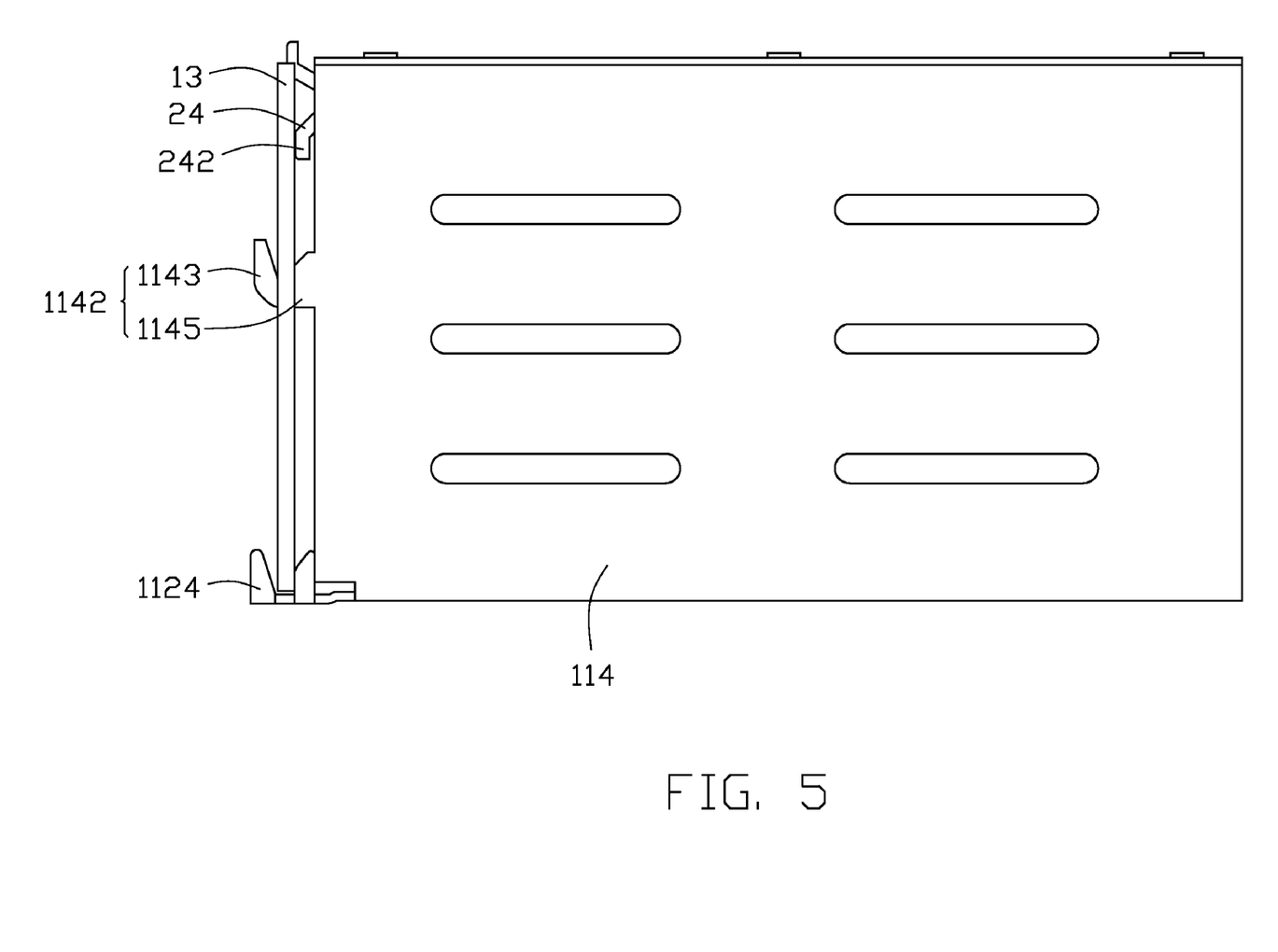
FIG. 5 is an assembled side view of FIG. 1, showing the back panel in a locked position.
Figure 6:
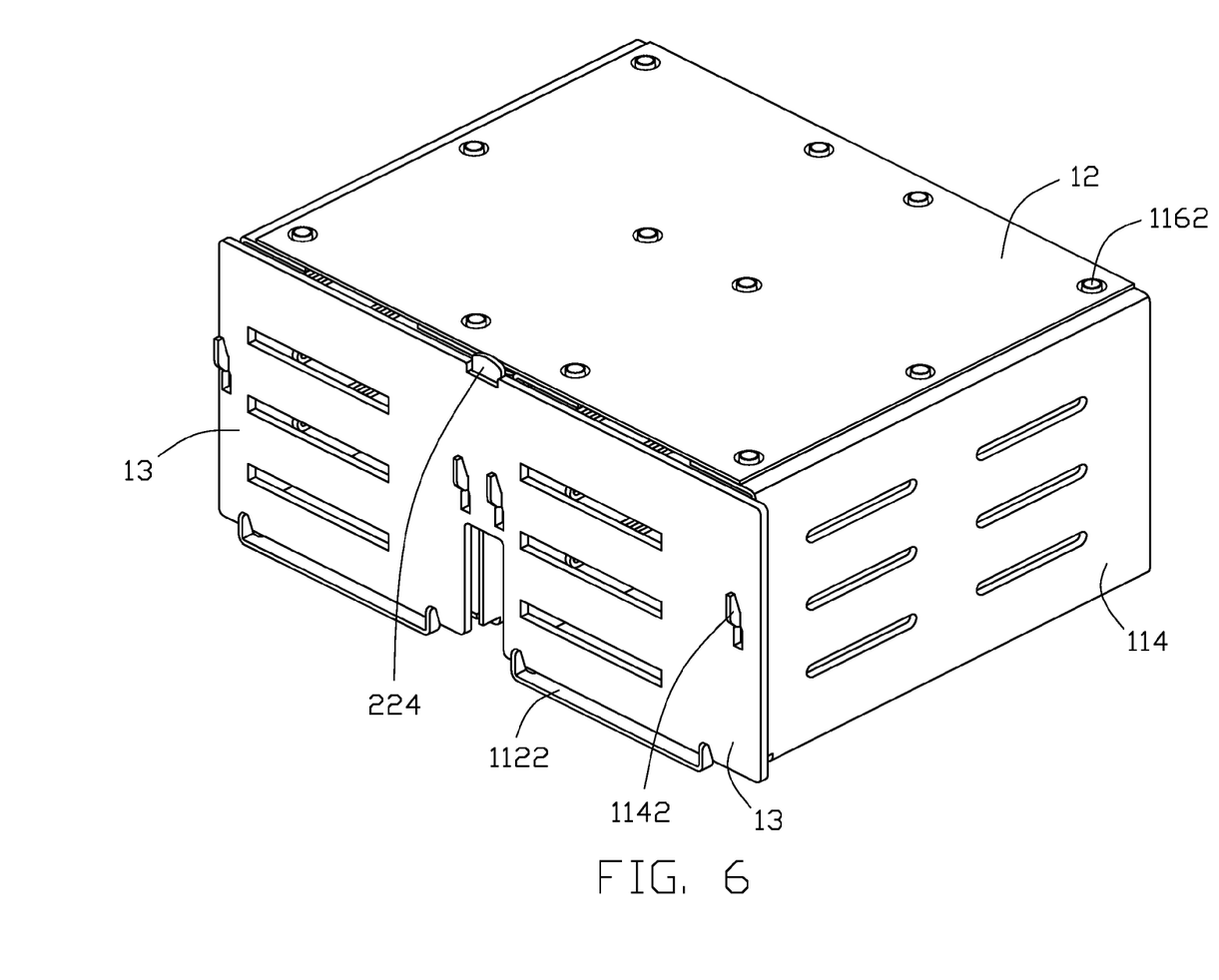
FIG. 6 is an assembled isometric view of FIG. 1, showing the back panel in a locked position.

Referring also to FIG. 2, The securing member 20 includes a pivoting portion 26, a first arm 22 extending upwards at an angle from the pivoting portion 26, and a second arm 24 extending downwards at an angle from the pivoting portion 26. A pair of pivots 262 protrudes from both sides of the pivoting portion 26 respectively. A resisting portion 242 extends from a free end of the second arm 24. An operating portion 224 extends from a free end of the second arm 22. A securing portion 226 protrudes down from a bottom of the operating portion 224 for engaging with the securing opening 134 of the back panel 13.

Referring also to FIGS. 1 to 6, in assembly, the pivots 262 of the securing member 20 are respectively inserted into the pivoting holes 1144 of the two adjacent side plates 114 of the brackets 11. The protrusions 1162 of the securing portions 116 of the brackets 11 are engaged with the through holes 122 of the top plate 12. The hook portions 1143 of the hooks 1142 of the drive bracket 20 are inserted into the locking openings 132 of the back panel 13 through the wide portions thereof.

The back panel 13 is pushed towards the bottom plate 112 of the bracket 11 along the guiding edges 1146 of the hooks 1142 in a vertical direction parallel to the back panel 13. An inner surface of the back panel 13 abuts on the resisting portion 242 of the second arm 24 of the securing member 20 to force the second arm 24 to move to the drive bracket assembly 10, which enables the first arm 22 to rotate. The back panel 13 is pushed down continually, until the back panel 13 is inserted into the positioning openings and sandwiched between the positioning tabs 1124 of the extending portion 1122 of the bottom plate 112. Then the shank portions 1145 of the hooks 1142 are slid into the narrow portions of the locking openings 132, and the hook portions 1143 of the hooks 1142 clamp against an outer surface of the back panel 13, thereby preventing the back panel 13 moving along a horizontal direction perpendicular to the back panel 13. At the same time, the resisting portion 242 of the second arm 24 resists on the rear edges of the adjacent side plates 114, and the securing portion 226 of the first arm 22 of the securing member 20 is secured in the securing opening 134 of the back panel 13, thereby fixing the back panel 13 on the drive bracket assembly 10, and preventing the back panel 13 moving along the vertical direction. The back panel 13 is thus secured to the drive bracket assembly 10. When the data storage devices are installed into the drive bracket assembly 10, the data storage devices are electrically connected with connectors on the back panel 13.

In removal of the back panel 13, the operating portion 224 of the first arm 22 of the securing member 20 is pressed towards the drive bracket assembly 10 to disengage the securing portion 226 of the first arm 22 from the securing opening 134 of the back panel 13, thereby releasing the back panel 13. The back panel 13 can be accordingly slid along the vertical direction until the hooks 1142 are positioned in the wide portions of the locking openings 132 of the back panel 13. The back panel 13 is disengaged from between the tabs of the drive bracket assembly 10, and can thus be removed from the drive bracket assembly 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus comprising:
   two drive brackets for receiving disk drives therein;
   a back panel having a securing opening defined therein; and
   a securing member pivotably mounted between the two brackets for rotating to engage with the securing opening of the back panel to secure the back panel on the drive brackets during the process that the back panel is mounted to the drive brackets;
   wherein the securing member comprises a pivoting portion pivoted between the drive brackets, a first arm extending upwards from the pivoting portion, and a second arm extending downwards from the pivoting portion for abutting against the back panel, the first arm comprising a securing portion for engaging with the securing opening of the back panel.

2. The mounting apparatus as described in claim 1, wherein the securing opening is defined in an edge of the back panel, and the first arm of the securing member comprises an operating portion with the securing portion protruding from a bottom thereof, the operating portion located on an outer side of the securing opening of the back panel for being pressed towards the drive bracket assembly to release the securing portion from the securing opening.

3. The mounting apparatus as described in claim 1, wherein a resisting portion extends from a free end of the second arm, wherein the resisting portion resists on end edges of the drive brackets when the back panel is mounted on the drive brackets.

4. The mounting apparatus as described in claim 1, wherein each bracket comprises two side plates, the securing member being pivotably mounted between the two adjacent side plates of the drive brackets.

5. The mounting apparatus as described in claim 4, wherein a hook extends from a rear end edge of at least one of the side plates, and the back panel has at least one locking opening for engagingly receiving the hook.

6. The mounting apparatus as described in claim 5, wherein the hook is L-shaped, and extends upwards.

7. The mounting apparatus as described in claim 6, wherein the hook forms an inclined guiding edge for guiding the back panel to slide therein.

8. The mounting apparatus as described in claim 1, wherein each bracket comprises a bottom plate, an extending portion extending from a rear end edge of the bottom plate, a pair of tabs being formed at opposite sides of the extending portion respectively with a positioning opening formed therebetween, for sandwiching a bottom edge of the back panel therebetween.

9. An assembly comprising:
   a drive bracket assembly forming a hook in a rear edge thereof, the hook having an inclined guiding edge;
   a securing member pivotably mounted to the drive bracket assembly; and
   a back panel having a securing opening and a locking opening therein, the back panel mounted on the drive bracket assembly in such a manner that the hook is inserted in the locking opening with one edge of the back panel adjacent the locking opening sliding on the guiding edge of the hook to guide the back panel sliding down to have the hook engage with the locking opening, for preventing the back panel moving along a first direction perpendicular to the back panel, and simultaneously guide the back panel to slide close to the drive bracket assembly to push a first portion of the securing member to enable a second portion of the securing member to rotate to engage with the securing opening of the back panel, for preventing the back panel moving along a second direction perpendicular to the first direction.

10. The assembly as described in claim 9, wherein the drive bracket assembly comprises two brackets for receiving disk drives, each bracket comprising two side plates, the securing member being pivotably mounted between the two adjacent side plates of the four side plates of the brackets.

11. The assembly as described in claim 10, wherein each bracket comprises a bottom plate, an extending portion extending from a rear end edge of the bottom plate, a pair of tabs being formed at opposite sides of the extending portion respectively with a positioning opening formed therebetween, for sandwiching the back panel therebetween.

12. The assembly as described in claim 9, wherein the securing member comprises a pivoting portion pivoted on the drive bracket assembly, a first arm extending upwards from the pivoting portion forming the first portion of the securing member, and a second arm extending downwards from the pivoting portion forming the second portion of the securing member, the first arm comprising a securing portion for engaging with the securing opening of the back panel.

13. The assembly as described in claim 12, wherein the first arm of the securing member comprises an operating portion for pressing towards the drive bracket assembly to release the back panel, the securing portion protrudes from a bottom of the operating portion of the securing member for engaging with the securing opening of the back panel.

14. The assembly as described in claim 12, wherein a resisting portion extends from a free end of the second arm, wherein the resisting portion resists on end edges of the drive bracket assembly when the back panel is mounted on the drive bracket assembly.

15. The mounting apparatus as described in claim 12, wherein the securing opening is defined in an edge of the back panel, and the first arm of the securing member comprises an operating portion with the securing portion protruding from a bottom thereof, the operating portion located on an outer side of the securing opening of the back panel for being pressed towards the drive bracket assembly to release the securing portion from the securing opening.

16. An assembly comprising:
   a back panel having a plurality of locking openings and a securing opening at a top edge thereof;
   two juxtaposed drive brackets for receiving a data storage device therein, each of the drive brackets having a bottom panel and two side panels extending from the bottom panel;
   a plurality of positioning tabs formed on the bottom panels, the positioning tabs cooperatively retaining a bottom edge of the back panel in position;
   a plurality of hooks each having a shank portion and a hook portion, the shank portion substantially horizontally extending from a rear edge of the corresponding side panel for supporting the back panel, the hook portion extending upward from a distal end of the shank portion and extending through the respective locking opening, the hook portion having a slanted guiding edge facing the side panel; and
   a securing member pivoted between the drive brackets, the securing member having a pivoting portion, a first arm extending upwards from the pivoting portion abutting against the top edge of the back panel and engagement in the securing opening, and a second arm extending downwards from the pivoting portion abutting against an inner side of the back panel which faces toward the drive brackets.

* * * * *